(12) United States Patent
Ozen et al.

(10) Patent No.: US 11,120,052 B1
(45) Date of Patent: Sep. 14, 2021

(54) DYNAMIC DISTRIBUTED DATA CLUSTERING USING MULTI-LEVEL HASH TREES

(71) Applicant: Amazon Technologies, Inc., Seattle, WA (US)

(72) Inventors: Mustafa Ozan Ozen, Vancouver (CA); Sandeep Bhatia, Bothell, WA (US); Atilim Cetin, Vancouver (CA); Lonnie J. Princehouse, Seattle, WA (US); Timothy Andrew Rath, Des Moines, WA (US); Gaurav Saxena, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 162 days.

(21) Appl. No.: 16/021,707

(22) Filed: Jun. 28, 2018

(51) Int. Cl.
  *G06F 16/28* (2019.01)
  *G06F 16/22* (2019.01)
  *G06F 16/2455* (2019.01)

(52) U.S. Cl.
  CPC ........ *G06F 16/285* (2019.01); *G06F 16/2246* (2019.01); *G06F 16/2255* (2019.01); *G06F 16/24554* (2019.01)

(58) Field of Classification Search
  CPC . G06F 16/285; G06F 16/2246; G06F 16/2255
  See application file for complete search history.

(56) References Cited

U.S. PATENT DOCUMENTS

| | | | |
|---|---|---|---|
| 6,757,686 B1* | 6/2004 | Syeda-Mahmood | ... G06F 16/51 |
| 7,299,239 B1 | 11/2007 | Basu et al. | |
| 7,685,109 B1 | 3/2010 | Ransil et al. | |
| 2006/0047902 A1 | 3/2006 | Passerini | |
| 2014/0046909 A1* | 2/2014 | Patiejunas | ........... G06F 11/1076 707/687 |
| 2015/0134666 A1 | 5/2015 | Gattiker et al. | |
| 2018/0246934 A1* | 8/2018 | Arye | .................. G06F 16/2272 |

(Continued)

FOREIGN PATENT DOCUMENTS

WO    20151070232 A1    5/2015

OTHER PUBLICATIONS

Non-Final Office Action, U.S. Appl. No. 16/021,701, dated Oct. 18, 2019, 17 pages.

(Continued)

*Primary Examiner* — Loc Tran
(74) *Attorney, Agent, or Firm* — Nicholson De Vos Webster & Elliott LLP

(57) ABSTRACT

Techniques are described for clustering data at the point of ingestion for storage using scalable storage resources. To cluster data at the point of ingestion, a data ingestion and query service uses a multilevel hash tree (MLHT)-based index to map a hierarchy of attribute values associated with each data element onto a point of a MLHT (which itself conceptually maps onto a continuous range of values). The total range of the MLHT is divided into one or more data partitions, each of which is mapped to one or more physical storage resources. A mapping algorithm uses the hierarchy of attribute fields to calculate the position of each data element ingested and, consequently, a physical storage resource at which to store the data element.

15 Claims, 11 Drawing Sheets

(56) References Cited

U.S. PATENT DOCUMENTS

2018/0341606 A1    11/2018    Bolkhovitin et al.
2019/0286636 A1     9/2019    Bedard et al.

OTHER PUBLICATIONS

Anonymous, "Oracle—Having partitiion on all distinct values where new value can come", Online available at <https://stackoverflow.com/questions/15546423/having-partition-on-all-distinct-values-where-new-value-can-come/15547218#15547218>, Mar. 21, 2013, 1 page.

International Search Report and Written Opinion, PCT App. No. PCT/US2019/038728, dated Sep. 6, 2019, 14 pages.

Final Office Action, U.S. Appl. No. 16/021,701, dated Mar. 18, 2020, 17 pages.

Notice of Allowance, U.S. Appl. No. 16/021,701, dated Sep. 8, 2020, 11 pages.

\* cited by examiner

DYNAMIC DISTRIBUTED DATA CLUSTERING USING MULTI-LEVEL HASH TREES

BACKGROUND

The number of computer-implemented systems and applications that involve collecting and analyzing time series data is on the rise. To store such data in a manner that is efficient for various types of data processing, an effective database clusters the data across both time and space (for example, such that data elements received near in time to one another are grouped together, and such that data elements sharing similar attribute values are grouped together). Among other benefits, the clustering of data in this way can significantly increase the performance of queries against the data by reducing an amount of data to be filtered when queries request similar types of data. This can in turn increase the responsiveness of data visualizations, dashboards, and any other uses of the data returned by such queries.

Most algorithms currently used to cluster such data assume that the data is stored in a single location, such as a non-distributed database. However, these algorithms are generally less efficient in distributed data storage environments, where a significant amount of data shuffling across a network can be required to cluster the data as desired. Thus, existing algorithms can be less useful for time series data collection and other situations where relatively large amounts of data are ingested over time to be stored in a distributed, scalable storage environment.

BRIEF DESCRIPTION OF DRAWINGS

Various embodiments in accordance with the present disclosure will be described with reference to the drawings, in which.

DETAILED DESCRIPTION

Figure 1:
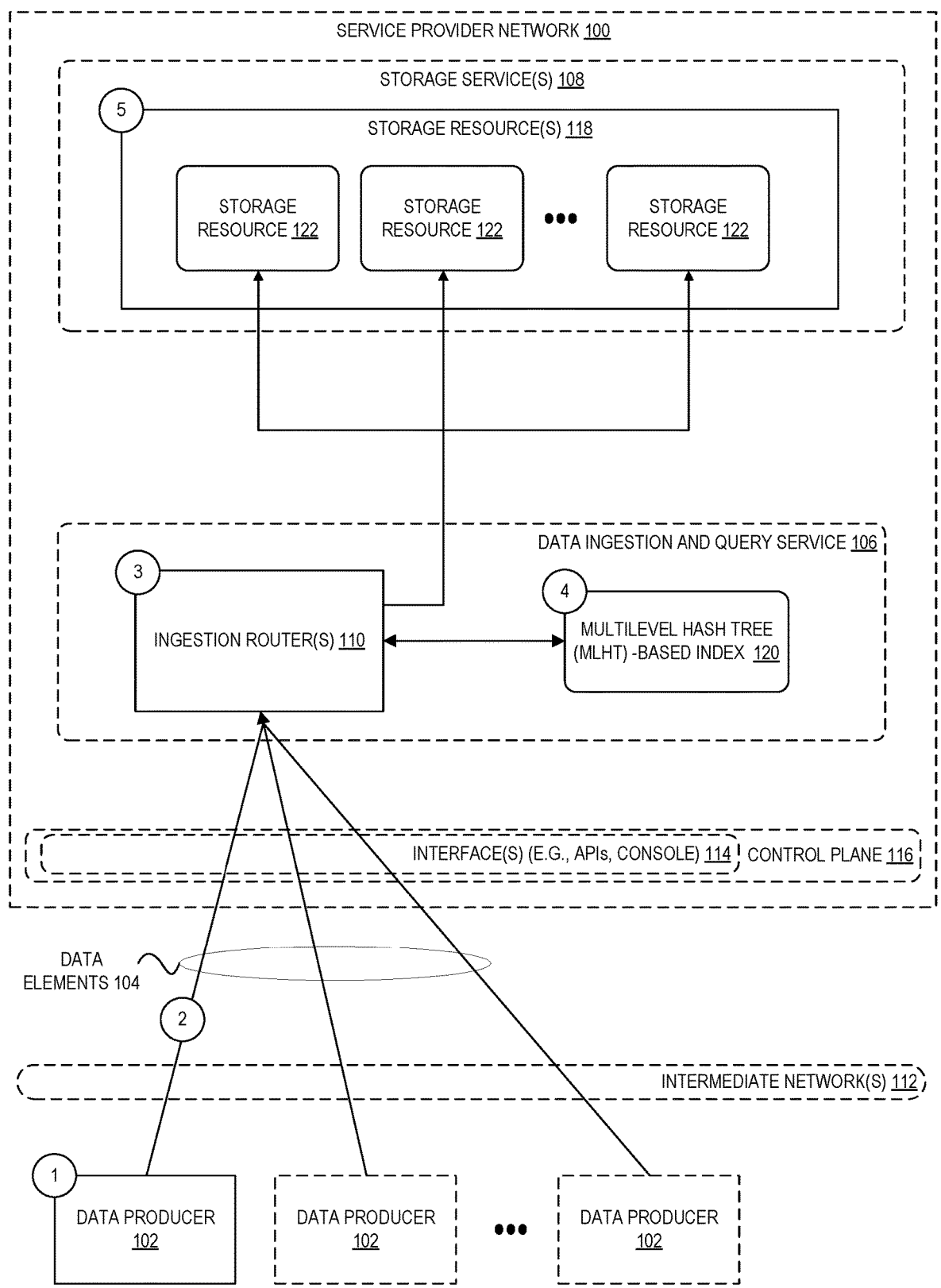
FIG. 1 is a diagram illustrating an environment for clustering data at the point of ingestion for storage using scalable storage resources according to some embodiments.

Various embodiments of methods, apparatus, systems, and non-transitory computer-readable storage media are described for clustering data at the point of ingestion for storage using scalable storage resources. In general, the clustering techniques described herein are used to cluster data elements in a manner such that data that is likely to be queried together is localized to a same partition, or to a minimal set of partitions if the data is large, where the partitions are mapped to physical storage resources where the data is to be stored for subsequent querying or other types of data processing. Among other benefits, the clustered storage of the data at the physical storage resources can reduce an amount of data that needs to be filtered by many types of queries, thereby improving the performance of any applications or processes that rely on querying the data.

As indicated above, the number of computer-implemented systems and applications that involve collecting and analyzing data, and times series data in particular, is on the rise. To store such data in a manner that is efficient for querying and other types of analyses, an effective time series database clusters the data across both time and space. Most algorithms used to spatially cluster data assume that the data is stored in a non-distributed database and thus perform the clustering operations on the data stored there. However, these algorithms are typically less efficient in distributed storage environments, where use of the algorithms involves shuffling data across a network to achieve a desired clustering. According to embodiments described herein, a clustering algorithm is described that can be used during ingestion of the data for efficient storage in a distributed storage environment. The performance of the clustering at the point of ingestion largely avoids the need to move previously stored data around as the data landscape changes, thus making the algorithm more efficient in distributed storage environments. Although many of the examples provided herein relate to clustering time series data, and can involve using characteristics of time series data, the techniques described herein generally can be used with non-time series data and other contexts as well.

In an embodiment, the clustering of data is based on a hierarchy of attribute values associated with the data, also referred to as a data "drill path," where each successive level of the attribute hierarchy represents a greater level of data granularity. For example, if an application involves collecting and analyzing time series data generated by a collection of sensors distributed across the United States, each time series data point may be associated with a region attribute, a state attribute, a city attribute, and so forth. In this example, the state attribute represents a subgrouping of the region attribute, and the city attribute represents a subgrouping of the state attribute. As another example, if time series data is generated by an application monitoring the performance of compute instances in a datacenter, each time series datapoint may be associated with a hierarchy of attributes including a region attribute, a virtual private cloud (VPC) attribute, a subnet attribute, and so forth. In each of these examples, the attributes may represent groupings of data that are frequently queried together and thus represent data that it would be useful to have clustered together. For example, users might frequently generate queries for all sensor data in the "Northeast" region, or for performance information for compute instances in a particular VPC, and thus an efficient data storage solution for this data clusters the data according to these attribute groups.

According to embodiments described herein, to cluster data at the point of ingestion in the manner described above, a data ingestion and query service uses a multilevel hash tree (MLHT)-based index to map a hierarchy of attribute values associated with each data element onto a point of a MLHT (which itself conceptually maps onto a continuous range of values). The total range of the MLHT is divided into one or more data partitions, each of which is mapped to one or more physical storage resources. In one embodiment, a mapping algorithm uses the hierarchy of attribute fields (for example, region→state→city) to calculate the position in the MLHT for each data element ingested and, consequently, a physical storage resource at which to store the data element. For data elements that are associated with N attribute fields, N separate hash values are calculated, where each hash value is a value in a range from 0 to maximum hash value−1. The total hash value range represents a node in the MLHT, where the hash value range corresponding to the top-level attribute in the attribute hierarchy corresponds to the root node of the MLHT. Any point in a hash range of the MLHT represents a full range on the next lowest level in the MLHT (except for the ranges representing the leaf nodes). Any point on a node at the leaf level can be represented by a set of MLHT coordinates (which is an N-tuple of hash values) and has an equivalent position on a continuous range of values.

In some embodiments, the data collected by a data ingestion system can also be organized based on a life-cycle of the data, such that various query patterns are supported at the lowest possible cost point. For example, queries that are used to troubleshoot problems in a datacenter in real-time may have significantly different requirements for latency, throughput, and necessary query expressiveness than is required for queries used to generate trend analyses across a year or more worth of data. For these reasons and others, embodiments described herein enable data to be transitioned across different types of storage resources over time depending on how the data is to be accessed.

Among other benefits, the use of a MLHT to cluster data at the point of ingestion enables a data analysis system to create and manage a mapping of data partitions to storage resources using a relatively small set of data. For example, each data partition that is mapped to a range of a MLHT (and thereby to any data elements that fall within the range) can be defined by as few as two data points: a first set of coordinates defining a lower boundary of the data partition and a second set of coordinates defining an upper boundary of the data partition. Data ingestion and query processes related to data indexed by the MLHT can then be performed by calculating one or more sets of coordinates for the relevant data elements and using the coordinates to find one or more relevant data partitions. For example, when a data element is received for ingestion, a hash function can be used to generate hash values of the data element's attribute values to obtain a set of coordinates, a current set of data partitions can be searched to find the data partition containing the point defined by the set of coordinates, and a storage resource associated with the data partition can be used to store the data element. In this manner, data elements sharing similar attribute values can be stored close to one another.

FIG. 1 is a diagram illustrating an environment for clustering data at the point of ingestion for storage using scalable storage resources according to some embodiments. In the example of FIG. 1, a plurality of data producers 102 generate data elements 104 that are sent to and clustered by a data ingestion router 110 of a data ingestion and query service 106 at a service provider network 100. Each of the data producers 102 generally can be any type of hardware- or software-based component that generates time series or other types of data such as, for example, sensors that monitor and record physical conditions of an environment in which the sensors are locate, monitoring software that monitors the performance and operation of various computing resources in a datacenter, and the like. The data producers 102 can be co-located near one another in a similar geographic location, or spread across a large geographic area. Although many of the examples described herein involve data producers 102 that generate time series data, the data ingestion and query service 106 can also be used for non-time series data that is similarly associated with one or more grouping attributes that can be used to cluster the data.

A provider network 100 provides users with the ability to utilize one or more of a variety of types of computing-related resources such as compute resources (for example, executing virtual machine (VM) instances or containers, executing batch jobs, executing code without provisioning servers), data and storage resources (for example, object storage, block-level storage, data archival storage), network-related resources (for example, configuring virtual networks including groups of compute resources, content delivery networks (CDNs), Domain Name Service (DNS)), application resources (for example, databases, application build/deployment services), and so forth. These and other computing resources may be provided as services, such as a hardware virtualization service that can execute compute instances, a storage virtualization service that can store data objects, and so forth. The users (or "customers") of provider networks 100 may utilize one or more user accounts that are associated with a customer account, though these terms may be used somewhat interchangeably depending upon the context of use. Users may interact with a provider network 100 across one or more intermediate networks 112 (for example, the internet) via one or more interface(s) 114, such as through use of application programming interface (API) calls, via a console implemented as a website or application, and so forth. The interface(s) 114 may be part of, or serve as a frontend to, a control plane 116 of the provider network 100 that includes "backend" services supporting and enabling the services that may be more directly offered to customers.

To provide these and other computing resource services, service provider networks 100 often rely upon virtualization techniques. For example, virtualization technologies may be used to provide users the ability to control or utilize compute instances (for example, a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the service provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

As indicated above, it is desirable at times to collect and store data elements 104 generated by data producers 102 at storage resources 118 provided by one or more storage services 108 of a service provider network 100. Furthermore, it is often desirable to have the data be clustered in a way that improves the performance of queries and other data processing operations. In an embodiment, at circle "1" in FIG. 1, one or more data producers 102 generate data elements 104 to be collected and stored and, at circle "2," the data elements 104 are sent over one or more intermediate networks 112 to a data ingestion and query service 106 of a service provider network 100. Although many of the examples described herein involve the collection and processing of data by a service of a service provider network 100, in other embodiments, the data elements 104 can be collected and processed by any computing device configured to perform the clustering techniques described herein.

For example, consider a company that manages sensor devices installed at various locations across the country and that each generate time series data. The sensors may be located, for example, in cars and used to monitor and report performance information for various components of the cars, or may be located in various datacenters and used to monitor the performance of servers and other computing resources over time. In these example, the time series data elements 104 may include information periodically sampled and provided by the sensors, where each individual data point includes a data payload and is further associated with one or more data attributes stored in fields of the data or in any other format. As indicated above, the data attributes associated with the data elements can be related as a hierarchy of attributes that provide information about the data at varying levels of data granularity.

Figure 2:
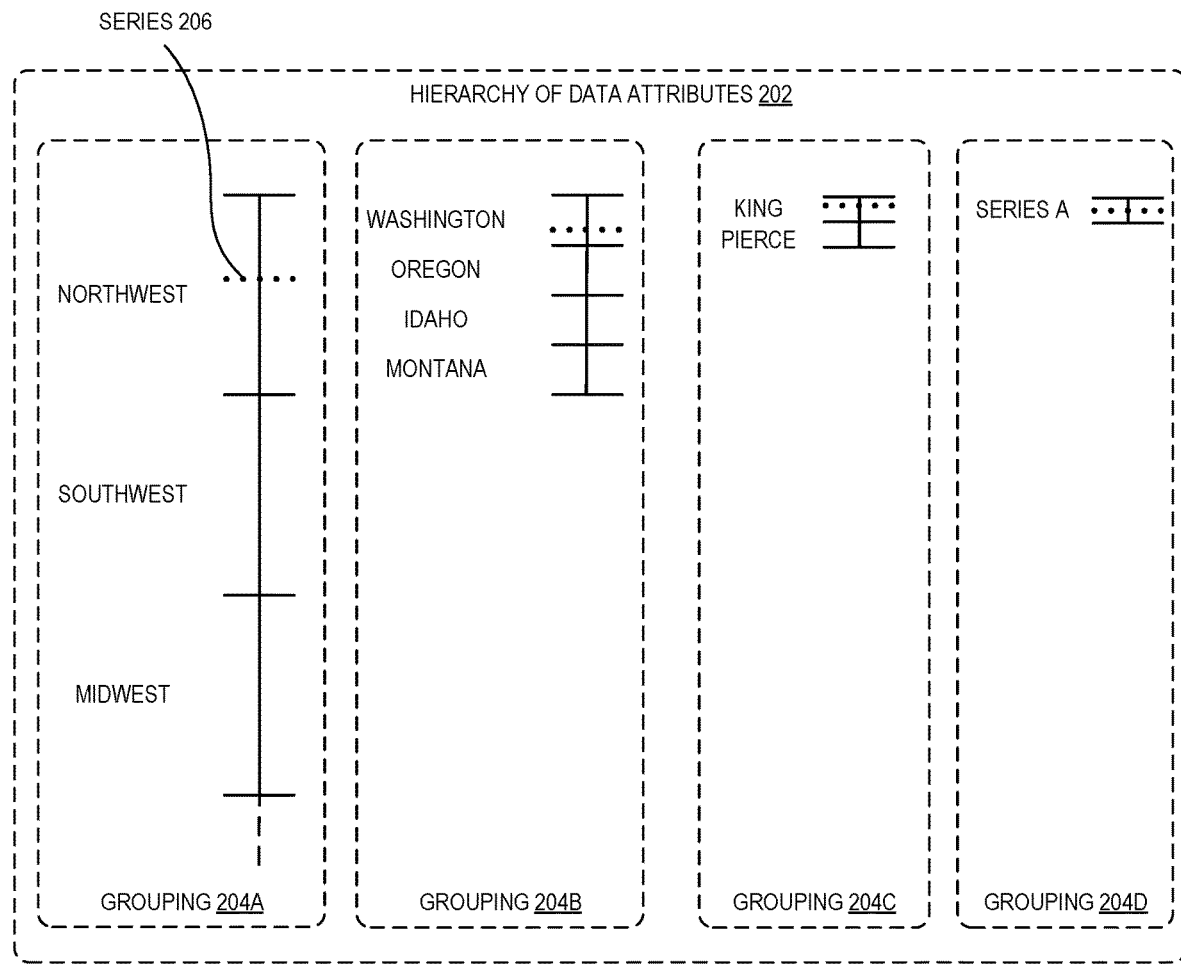
FIG. 2 illustrates an example hierarchy of grouping attributes associated with data elements generated by a distributed collection of data producers according to some embodiments.

FIG. 2 is a diagram illustrating an example hierarchy of data attributes 202 associated time series data generated by a collection of sensors distributed across the United States. In the example shown in FIG. 2, data generated by the sensors is associated with attributes including a region, state, and county (represented by the groupings 204A-204D), where these attributes represent groupings of the data by which the data is likely to be queried or otherwise managed. Thus, the groupings 204A-204D shown in FIG. 2 collectively represent a desirable clustering of the data, such that data generated by a same sensor is spatially clustered together, data generated by sensors in a same county is clustered, data generated by sensors in same state are clustered, and data generated by sensors in a same region is clustered.

In FIG. 2, for example, the time series 206 corresponds to a time series generated by a particular sensor located in King county, which is located in Washington state in the Pacific Northwest region of the United States. Other sensors may be located in other regions, states, and counties, as indicated by the other sections of the lines representing each of the groupings 204A-204D. In this example, it is desirable for the time series data elements 104 to be clustered into a same spatial partition or a minimal set of partitions, similarly for data generated by other devices within King County, and for devices located within Washington state and devices in the Northwest region. For these reasons and others described herein, it is desirable to have a clustering algorithm that enables the data to be progressively clustered based on a hierarchy of grouping attributes, clustered across a spatial range such that each partition of the range that can be further segmented into additional sub-partitions, and such that the ranges associated with the partitions can be adjusted dynamically as the cardinality of attribute values changes, the ranges are dynamically adjusted to account for the throughput observed by the system, and the data can be queried efficiently based on the clustering.

Returning to FIG. 1, to configure a data ingestion and query service 106 to ingest and cluster data elements 104 generated by such data producers 102 as described above, a user can use an interface 114 (for example, a graphical user interface (GUI) or other type of interface) to create and configure storage resources 118 to store the data and to further provide input indicating that the user desires for the data to be stored at the resources to be clustered. In some embodiments, as part of this process, the user can provide input specifying a hierarchy of attributes associated with the data to be collected, where the hierarchy of attributes represent groupings of data that the user anticipates are likely to be queried together, as shown above in the example of FIG. 2. The specification of a data attribute hierarchy can include identifying one or more fields in the data that contain values for each of the data attributes, or provide input indicating how one or more of the data attributes can be derived from a field contained in the data. For example, a user might provide input indicating that a data attribute hierarchy for a collection of time series data to be collected is Region→State→County→City, and the user can further specify field names or other identifiers of locations where values for each of the attributes can be found in the data.

In other embodiments, a data ingestion and query service 106 can automatically identify some or all of a hierarchy of data attributes associated with time series data to be collected by monitoring and analyzing queries executed against similar data that is already stored. For example, the data ingestion and query service 106 or another component can monitor queries executed against the data and identify attributes of the data that are frequently grouped in the queries. As another example, a user or application may also define various "roll-ups" and other stored queries to be used in GUI dashboards or other applications, and the groupings used to create the stored queries can be used to determine a hierarchy of data attributes. In some embodiments, a data ingestion and query service 106 determines an attribute hierarchy by analyzing a query history to estimate a hierarchy that provides the best system performance (for example, in terms of latency or throughput). Furthermore, a data ingestion and query service 106 may adapt an attribute hierarchy after some amount of data has been ingested, at the expense of tracking additional metadata. In other examples, where a customer desires to collect data for which no particular attribute hierarchy is apparent, the service 106 can assign and use an arbitrary attribute hierarchy to cluster the data (for example, based on an alphabetical ordering of the attribute names or random ordering).

As indicated above, the data to be ingested ultimately is stored using storage resources 118. In an embodiment, each storage resource 122 of the storage resources 118 represents any type of data storage (in-memory databases, disk-optimized databases, data streams, files, and so forth), and can further include a tiered set of storage resources. For example, the most recently ingested data may be stored in fast, but expensive, in-memory databases. After a period of time, that data can be transferred to files for storage in less expensive storage provided by a different storage service 108. In an embodiment, a data ingestion and query service 106 provides a frontend that enables users to configure how the data collected by the service transitions from one type of storage to another.

In an embodiment, at circle "3," data elements 104 are received by an ingestion router 110 and, at circle "4," a clustering of the data is performed using a MLHT-based index 120. In an embodiment, the MLHT-based index 120 can be stored at a storage location that is part of the data ingestion and query service 106, as shown in FIG. 1, or more generally can be stored at any storage location accessible to the ingestion router 110, including a storage location local to the router or using a storage location provided by a separate storage service 108 of the service provider network 100.

In an embodiment, the use of an MLHT-based index generally involves mapping a hierarchy of attribute values associated with each data element of data elements 104 onto a point of the MLHT (which itself conceptually maps onto a continuous range of values). The total range of the MLHT is divided into one or more data partitions, each of which is mapped to one or more physical storage resources. In an embodiment, a mapping algorithm uses the hierarchy of attribute fields (for example, region→state→city) to calculate the position in the MLHT for each data element ingested and, consequently, a physical storage resource at which to store the data element. For data elements that are associated with N attribute fields, N separate hash values are calculated, where each hash value is a value in a range from 0 to maximum hash value−1. The total hash value range represents a node in the MLHT, where the hash value range corresponding to the top-level attribute in the attribute hierarchy corresponds to the root node of the MLHT. Any point in a hash range of the MLHT represents a full range on the next lowest level in the MLHT (except for the ranges representing the leaf nodes). Any point on a node at the leaf level can be represented by a set of MLHT coordinates (which is an N-tuple of hash values) and has an equivalent position on a continuous range of values, as further illustrated below.

As indicated above, while an ingestion router 110 may have information indicating a hierarchy of data attributes associated with the time series data elements 104 that the router can use to cluster the data, an ingestion router 110 otherwise may be unaware of the set of possible values associated with each attribute of the attribute hierarchy for the data elements being ingested. For example, an ingestion router 110 may be aware that an attribute hierarchy includes a "state" attribute, but may not be aware that the data to be ingested includes the values "Washington," "California," "Texas," and so forth, for the "state" attribute. Thus, in one embodiment, a set of data partitions associated with a MLHT initially may include only a single partition representing the entire range of the MLHT, and data elements initially received by the ingestion router 110 are associated with this data partition. Eventually, a throughput level associated with the data partition, or an amount of data to be stored, approaches or exceeds a defined threshold thereby causing a partition split to occur, which is described in more detail hereinafter. In other embodiments, a MLHT may initially be associated with two or more data partitions based on anticipated demand.

Figure 3:
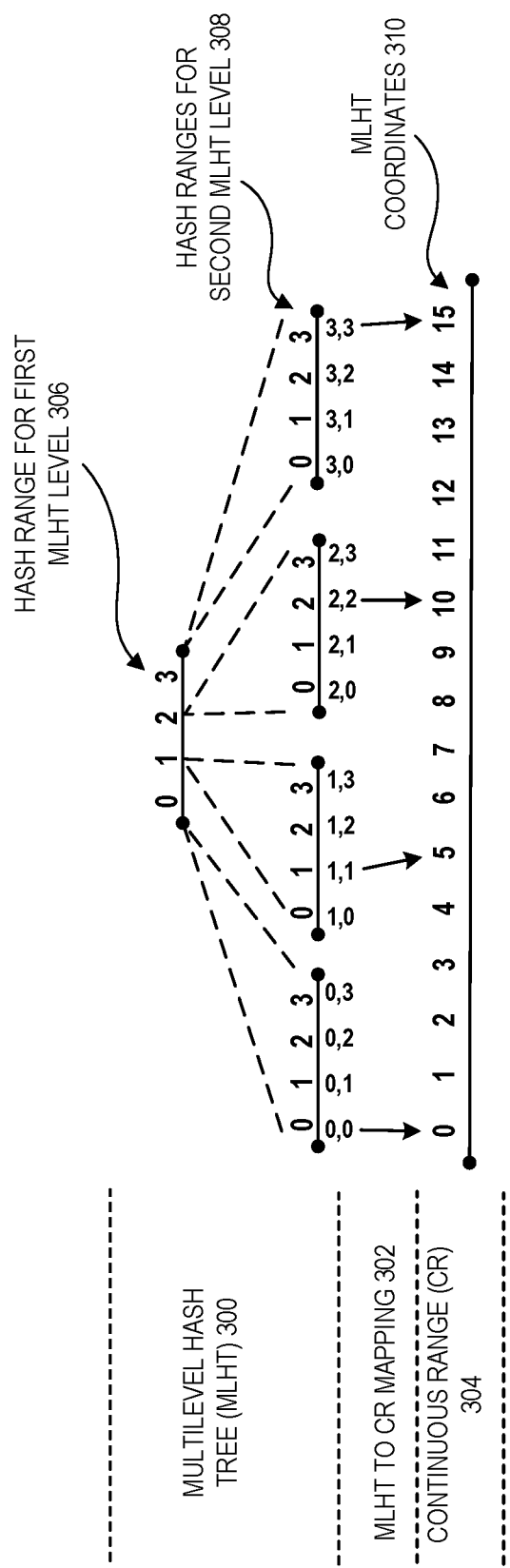
FIG. 3 is a diagram illustrating an example of a multi-level hash tree (MLHT) and a corresponding continuous range of values according to some embodiments.

FIG. 3 illustrates an example MLHT 300 used to cluster data elements associated with a two-level hierarchy of data attributes, where the MLHT 300 is based on a hash function with a max hash value=4 (that is, the total range of possible hash values for each attribute value is 0-3). The example MLHT 300 shown in FIG. 3 includes only two tree levels; in general, a MLHT includes any number of levels depending on a number of attribute fields in the attribute hierarchy associated with the data being ingested. In some embodiments, the hash function used to generate the hash values is selected to be one that exhibits a high level of collision resistance (for example, a hash function that maps text strings to a 128- or 256-bit number with a minimal number of collisions).

As indicated above, the example MLHT 300 can be used to cluster data elements that are associated with a hierarchy of attributes that includes two attributes (for example, a hierarchy of attributes values specifying region→state). As shown in FIG. 3, the first MLHT level 306 includes a single range of hash values (representing the root node of the MLHT and, in this example, corresponding to the region attribute) and each hash value on the first MLHT level 306 is associated with a separate respective range of hash values at a second MLHT level 308. As an example of how a data element can be mapped to a point on the MLHT 300, assume that a data element is received and is associated with the following attribute values: region="Northwest"; state="Washington." Using a hash function, the attribute value "Northwest" can be mapped to one of the values on the hash range for the first MLHT level 306 (for example, the hash value for "Northwest" might be 1) and the attribute value "Washington" can be mapped to one of the values on the corresponding hash range at the second MLHT level 308 (for example, the hash value for "Washington" might also be 1). In this example, the data element is thus associated with the set of coordinates [1, 1], where the first coordinate (1) indicates a point on the hash range of the first MLHT level 306 and the second coordinate (1) indicates a point on the corresponding hash range of the second MLHT level 308.

In an embodiment, each unique set of coordinates of the MLHT 300 maps to a distinct point on a continuous range (CR) 304 of coordinates 310 using a MLHT to CR mapping 302. For example, as shown in FIG. 3, the set of coordinates [1, 1] calculated for the example data element above maps to the value 5 on the CR 304 (indicated by the arrow connecting the coordinates [1, 1] to the value 5 on the CR 304). The arrows shown in FIG. 3 further illustrate that the set of coordinates [0, 0] maps to the value 0, the set of coordinates [2, 2] maps to the value 10, the set of coordinates [3, 3] maps to the value 15, and each of the coordinates in-between these points map to other values on the continuous range (for example, [0,1] maps to 1, [2, 3] maps to 11, and so forth). In some embodiments, an ingestion router 110 may not actually calculate a CR value any of the data elements being ingested, but rather the CR representation is used to illustrate that each unique point on a MLHT 300 maps to a point on a continuous range of values. The representation of the continuous range further illustrates that no MLHT coordinates overlap on the continuous range and that, for most adjacent points on the continuous range, those adjacent points correspond to adjacent points on a same node of the MLHT (for example, the points 5 and 6 on the continuous range correspond to the MLHT coordinates [1, 1] and [1, 2], respectively, which are adjacent to one another on a same node of the MLHT 300).

In one embodiment, the definition of a set of MLHT coordinates MLHTC for a data element "data" associated with an N-level hierarchy of attributes=[Hash(data.attribute0), Hash(data.attribute1), Hash(data.attribute2), . . . , Hash(data.attributeN)], and the calculation to map a set of MLTH coordinates to a point on a continuous range= $(MLHTC(1)*\text{max hash value}^{N-1})+(MLHTC(2)*\text{max hash value}^{N-2}) \ldots +MLHTC(N)$.

Figure 4:
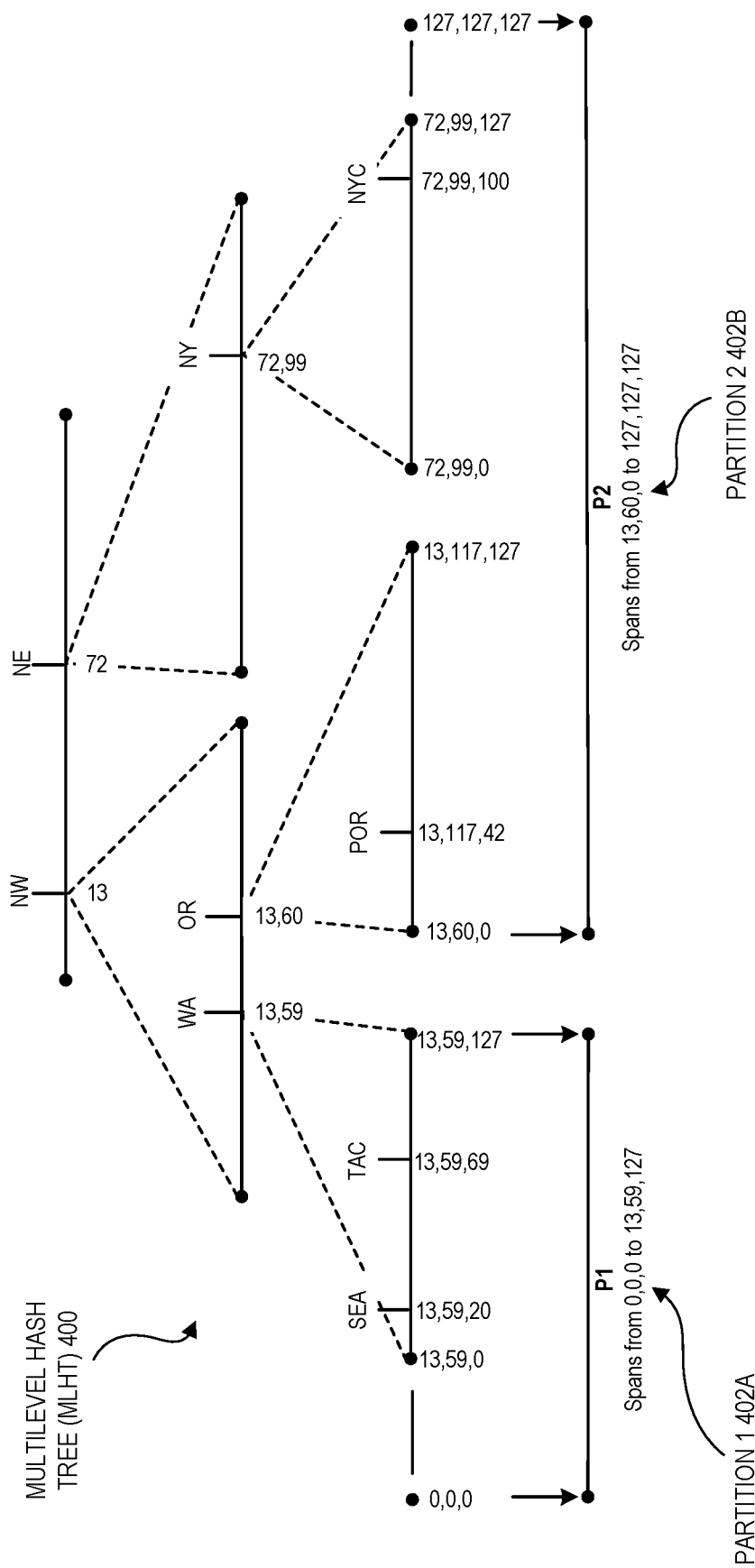
FIG. 4 is a diagram illustrating an example of a mapping between a MLHT and a set of storage partitions according to some embodiments.

As indicated above, ranges of a MLHT can be mapped to a set of one or more data partitions that are then mapped to physical storage resources where data elements are stored. In general, the assignment of ranges of the MLHT to data partitions is accomplished relative to the leaf nodes of the MLHT. FIG. 4 illustrates an example of a MLHT 400 generated for data that is associated with a hierarchy of three attribute fields (for example, region→state→city), and where the MLHT is generated using a hash function that has a max hash value=127. In the example shown in FIG. 4, a total of four data elements have been received by an ingestion router 110 thus far having the following attribute values: data element 1=(NW, WA, SEA), data element 2=(NW, WA, TAC), data element 3=(NW, OR, POR), and data element 4=(NE, NY, NYC). For clarity, the subranges that are not currently associated with any corresponding data elements are omitted in the figure, and the start of the range on leaf level [0, 0, 0] and the end of the range [127, 127, 127] are represented only as points.

In an embodiment, a data ingestion and query service 106 keeps track of a set of data partitions as an ordered list, where each data partition is defined by a pair of MLHT coordinates (specifying the start and end of the data partition range, respectively) and is further identified by a data partition label. In the example of FIG. 4, the set of data partitions includes two data partitions, including a first partition 402A labeled "P1" defined by a first set of coordinates [0, 0, 0] and a second set of coordinates [13, 59, 127], and also including a second partition 402B labeled "P2" defined by a first set of coordinates [13, 60, 0] and a second set of coordinates [127, 127, 127]. It is noted that the cumulative set of partitions "P1" and "P2" covers the entire range of the MLHT from [0, 0, 0] to [127, 127, 127] in a non-overlapping manner and, thus, any data element mapped to a point on the MLHT falls within one of the partitions. For example, the data element 1 (NW, WA, SEA) is mapped to the set of coordinates [13, 59, 20] which is in the range of partition "P1" and the data element 3 is mapped to the set of coordinates [13, 117, 42] which is in the range of partition "P2."

In an embodiment, each of the data partitions of a set of data partitions is mapped to one or more physical storage resources used to store data elements that are associated with points within the corresponding range. For example, each partition may be mapped to a separate storage engine, database table, data stream, or any other types of storage resource. As indicated above, the data can also be stored across multiple storage tiers each having different performance characteristics. For example, recently ingested data initially can be stored at a "hot" tier comprising in-memory databases or other high performance datastores to support queries at a high level of performance. The storage of the data can further include generating one or more pre-aggregations of the data that work in streaming fashion such that stream processors are doing streaming aggregation and periodically reporting those aggregations having a smaller data size relative to the entire set of data from which the aggregations are computed. A next storage layer can include a "cold" tier where the file sizes used to the store the data are optimized with the tradeoff of slower query times.

When an ingestion router 110 receives a new data element, the router computes a set of MLHT coordinates based on the attribute values associated with the data element to generate a set of coordinates, as described above. In an embodiment, using the set of coordinates for the data element, the ingestion router 110 performs a binary search of the list of current data partitions to determine which partition range includes the set of coordinates calculated for the data element, and the ingestion router 110 can then route the data element to the storage resource(s) associated with the identified data partition. The complexity for identifying the data partition to which a data element belongs is O(log(K)*L), where K is the number of data partitions and L is the number of levels in the MLHT.

As indicated above, data partitions can be split over time based on observed throughput levels for each partition to align storage resources with areas of the MLHT that are associated with a relatively large amount of data. In an embodiment, to determine when to split one or more partitions, a data ingestion and query service 106 monitors the throughput associated with each data partition associated with a MLHT. For example, a stream processor or other component of the service 106 can track individual throughput for each data series received from a data producer 102 (for example, in terms of data elements received per unit of time, amount of data received per unit of time, or any other throughput measure) and, when a cumulative throughput for the series in a same data partition approaches or exceeds a defined throughput threshold, a partition split is triggered. In one embodiment, the service 106 can keep track of the throughput levels for each data series in a skip list based on MLHT coordinates associated with each series ingested by the service.

In an embodiment, when the data ingestion and query service 106 makes the determination to split a data partition based on the observed throughput associated with the partition, the service analyzes the partition to determine an optimal location in the range represented by the partition at which to make the split. For example, an optimal location at which to split a data partition may generally correspond to a point that splits the partition into two or more sub-partitions, where the resulting sub-partitions have a minimum amount of difference in the respective cumulative throughput levels (in other words, the resulting sub-partitions are associated with approximately a same amount of throughput). In one embodiment, to calculate the set of coordinates at which to split a partition, a data ingestion and query service 106 aggregates throughput measurements associated with series that fall within the partition starting from both ends of the partition and working towards the middle of the partition.

Figure 5:
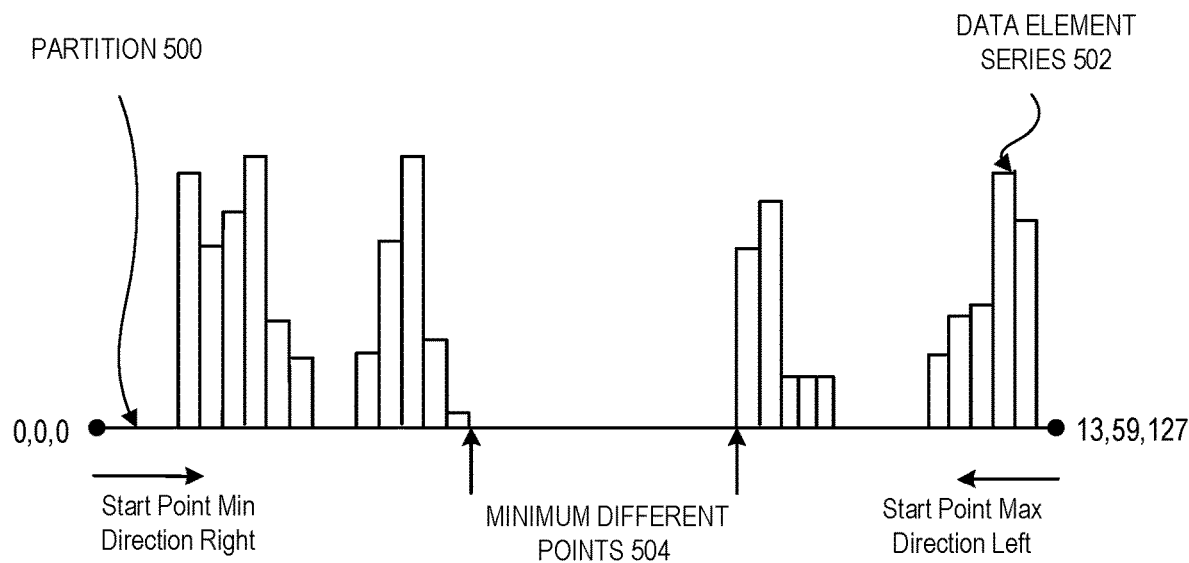
FIG. 5 is a diagram illustrating an example graph representing throughput information for a storage partition, and further illustrates using the throughput information to determine a location at which to split the partition according to some embodiments.

FIG. 5 shows an example graph illustrating a process for determining a point at which to split a partition 500. In the example shown in FIG. 5, the x-axis represents the range of the partition 500 and each bar on the range represents a relative throughput for a data element series on the partition. For example, a data element series 502 may represent a data element series corresponding to data produced by a sensor in city of Portland (and thus in the state of Oregon and in the Northwest region), while data produced by other sensors at other locations are represented by other bars on the graph. As shown, the data element series 502 is associated with a relatively high throughput compared to other data series that are part of the same partition 500.

The notations at the bottom of the graph in FIG. 5 illustrate an algorithm for determining where to split the partition based on the measured throughput levels in the graph. For example, a data ingestion and query service 106 may start aggregating the throughput levels starting from the left-most data element series and moving to the right until the value exceeds the aggregated value of the throughput levels starting from the right-most data element series and moving to the left, and vice versa, until all series are processed. In general, the calculation attempts to find a minimum and maximum point on the range of the partition such that the throughput load is divided with approximately half of the load assigned to one sub-partition and the other half of the load is assigned to the other sub-partition. In the example of FIG. 5, the minimum different points 504 represent a minimum and maximum point on the partition 500 such that the throughput load is approximately equal on each side of the partition.

In an embodiment, if the minimum and maximum point at which the calculation meets corresponds to a point between two immediately adjacent series (that is, there is not a point on the partition range between the two series), the partition can be split at that point. If the minimum and maximum points do not correspond to two immediately adjacent series of the partition, then there exists a range of points at which the partition can be split. For example, as shown in FIG. 5, the identified minimum different points 504 are associated with series that are not immediately adjacent and, thus, the partition 500 can be split at any point between the two minimum different points 504.

In an embodiment, in cases where a range of coordinates are identified as possible points to split a partition, then the service 106 selects adjacent coordinates that are on the highest possible level of the MLHT in the range. For example, if the range of coordinates at which a partition can be split ranges from [13, 144, 2] and [13, 147, 102], a partition split may be selected at [13, 145, 127] and [13, 146, 0] so that the split is on the boundary of nodes at the second level of the MLHT and does not split up any of the leaf node ranges. The selection of a partition split point at the highest possible level increases the likelihood that data series that are part of a same MLHT node stay together after a partition split. In one embodiment, instead of attempting to precisely balance the throughput levels of series on one side of a sub-partition relative to series on the other side of a partition, the service can instead attempt to balance the throughput within an acceptable range (for example, so that the cumulative throughput level of one partition is within 5% of the other partition), which can provide additional range for selecting a point at which to split a partition and opportunity to avoid splitting lower level nodes of the MLHT.

Figure 6:
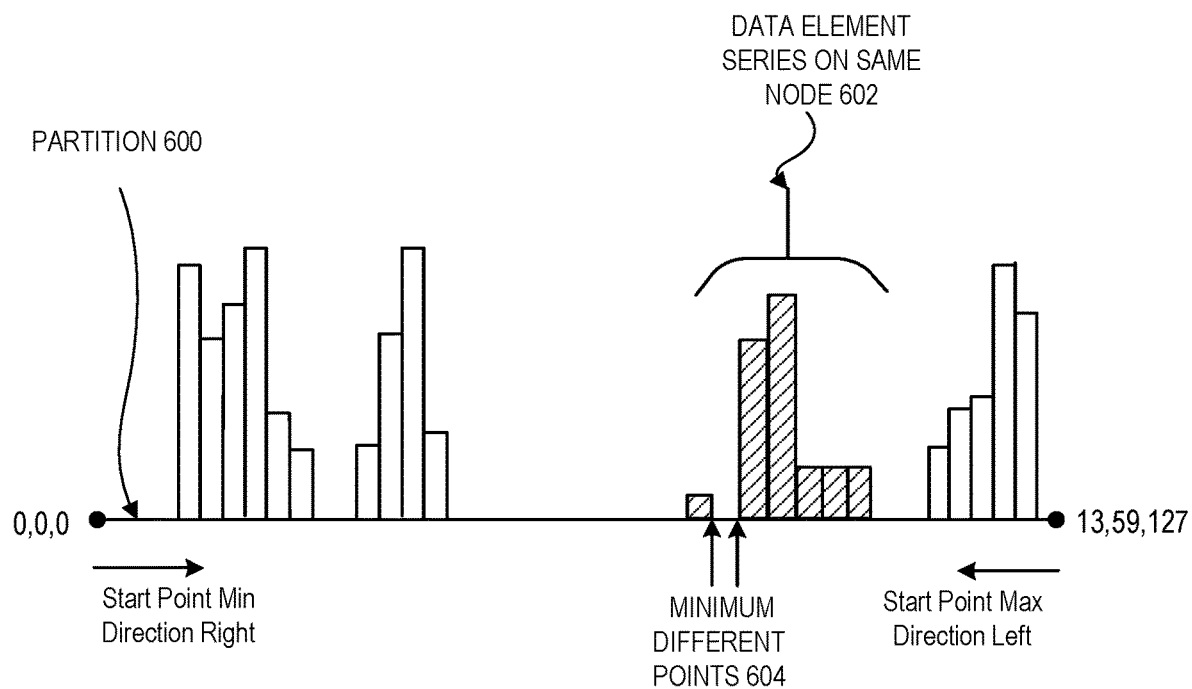
FIG. 6 is a diagram illustrating another example graph showing throughput for a partition and using the throughput information to determine a location at which to split the partition according to some embodiments.

FIG. 6 illustrates another example graph illustrating a process for determining a point at which to split a partition. As shown in FIG. 6, the minimum different points 604 calculated for the partition 600 fall between a set of data element series 602 that are part of a same node of a MLHT. If a partition split is made in the range between the minimum different points 604, as described above, the data series that were previously part of a same leaf node of the MLHT may be split onto two different data partitions and thus different storage resources going forward. However, if the data element series 602 are configured to stay part of a same data partition, a partition split location can instead be selected elsewhere (for example, at a point to the left of the data element series 602) at the cost of a small throughput imbalance in the resulting sub-partitions.

In some embodiments, the service 106 maintains a record of when each partition split occurs and the ranges associated with the set of partitions at each point in time. In this manner, if a query is received requesting data associated with a time range before the creation of the most recent set of partitions, the service can target the older data partitions to locate the relevant data. For example, if a service starts with a single partition labeled "partition 1," once the partition is split, two new partitions labeled "partition 2" and "partition 3" are created and the "partition 1" is effectively inactive but can be targeted by queries requesting data associated with a time range before the "partition 1" was split.

In an embodiment, the MLHT-based index 120 created by the ingestion router 110 can be used to process queries against the data stored at the storage resources 118. For example, a query might specify a time range ("the last five minutes", "from June 1 to June 3," and so forth) and/or one or more attributes values used to filter data of interest ("all data in the Northwest region," "all data in Seattle and Dallas," and so forth). In an embodiment, when a query targets an attribute or range of attributes, a query router of a data ingestion and query service 106 computes minimum and maximum MLHT coordinates associated with the query. The query router uses this information to find a minimum and maximum data partition associated with the query using the same calculations used during ingestion of the data and can then route the query to the storage resources associated with the identified data partitions and merge the results.

For example, assume that a query targets data associated with a single attribute (all data associated with city of Portland). In this example, a data ingestion and query service 106 can map the attribute value "Portland" to the coordinates [13, 20, 142], use the set of coordinates to perform a binary search of the set of data partitions to determine which partition includes the calculated set of coordinates, and then target the storage resource(s) associated with the identified data partition. In other examples, where a query targets a range of attributes, the service can calculate a minimum and maximum set of coordinates and use those coordinates to identify a set of one or more data partitions. For example, assuming the system currently has five data partitions mapped respectively to five separate storage resources, if the calculation indicates that a "partition 2" include the minimum set of coordinates and a "partition 4" includes the maximum set of coordinates, then processing of the query can be handled by storage resources 2-4 and the service can union the results from each resource.

In an embodiment, an inverted index can be used to improve the performance of some queries involving the MLHT-based index 120. For example, assume that a query is received requesting data elements associated with an attribute value "Northwest" for the region attribute. Once the coordinate calculation for the "Northwest" attribute value is calculated once, the result can be stored in an inverted index with a mapping to the associated partitions, thereby avoiding the need to perform the calculations for future requests.

As indicated herein, in some embodiments, the generation of a MLHT is based on calculating hash values for the attribute values associated with data elements being ingested. The use of a hash function creates an upper bound for the amount of data that is used to represent a coordinate corresponding to an attribute value. In other embodiments, however, the attribute values themselves can be used instead of the hash values (for example, in cases where the attribute values are strings that consume less data than a corresponding hash value would use). In addition to using less space in some cases, the use of the attribute values to define the coordinates can avoid the computation overhead of using the hashing function.

Figure 7:
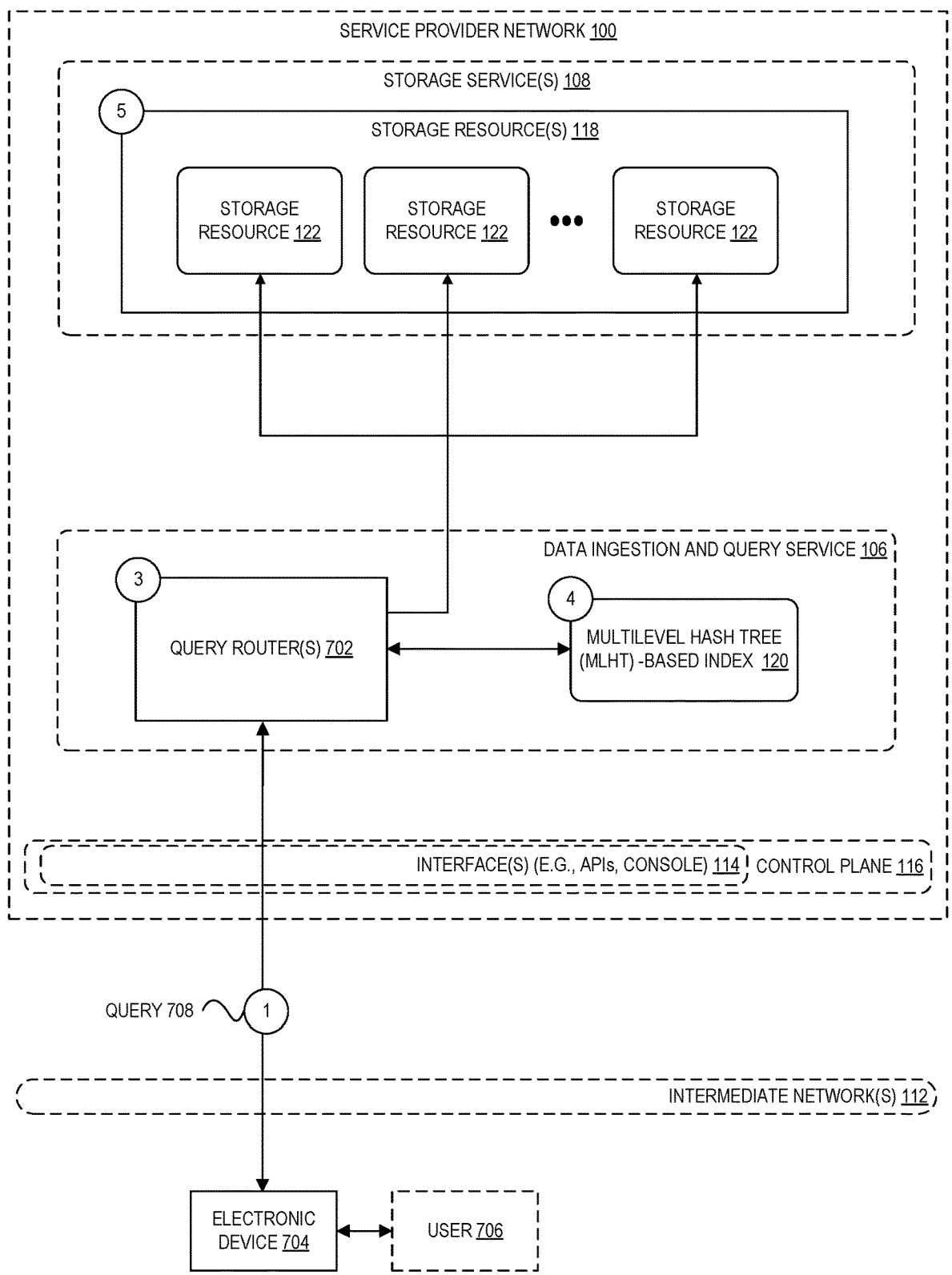
FIG. 7 is a diagram illustrating an environment for using a MLHT to process a query according to some embodiments.

FIG. 7 is a diagram illustrating an environment for using a MLHT-based index to process a query according to some embodiments. As indicated above, it is desirable at times for users to query the data stored by a data ingestion and query service 106. At circle "1" in FIG. 7, for example, a user 706 uses an electronic device 704 (for example, a laptop, desktop computer, or the like) to generate a query 708 sent to a query router 702 of the data ingestion and query service 106. The user 706 can generate the query 708 using an API 114 or any other type of interface for communicating with a query router 702. Although the example shown in FIG. 7 illustrates a user-generated query generated by an electronic device 704 that is external to the service provider network 100, in other examples a query 708 can be generated by a user or other component that is internal or external to the service provider network 100.

At circle "2" in FIG. 7, a query router 702 receives the query 708 and, at circle "3," uses the MLHT-based index to identify one or more storage resources 118 storing data requested by the query. As indicated above, a query router 702 can compute minimum and maximum MLHT coordinates associated with the query to identify one or more storage resources 122 to which the query relates (for example, by similarly using the processes described herein to identify MLHT coordinates for ingested data elements). In an embodiment, at circle "4," the query router 702 can use the identified storage resources to locate data satisfying the query, union the results from each storage resource searched, and return a response to the requesting device.

Figure 8:
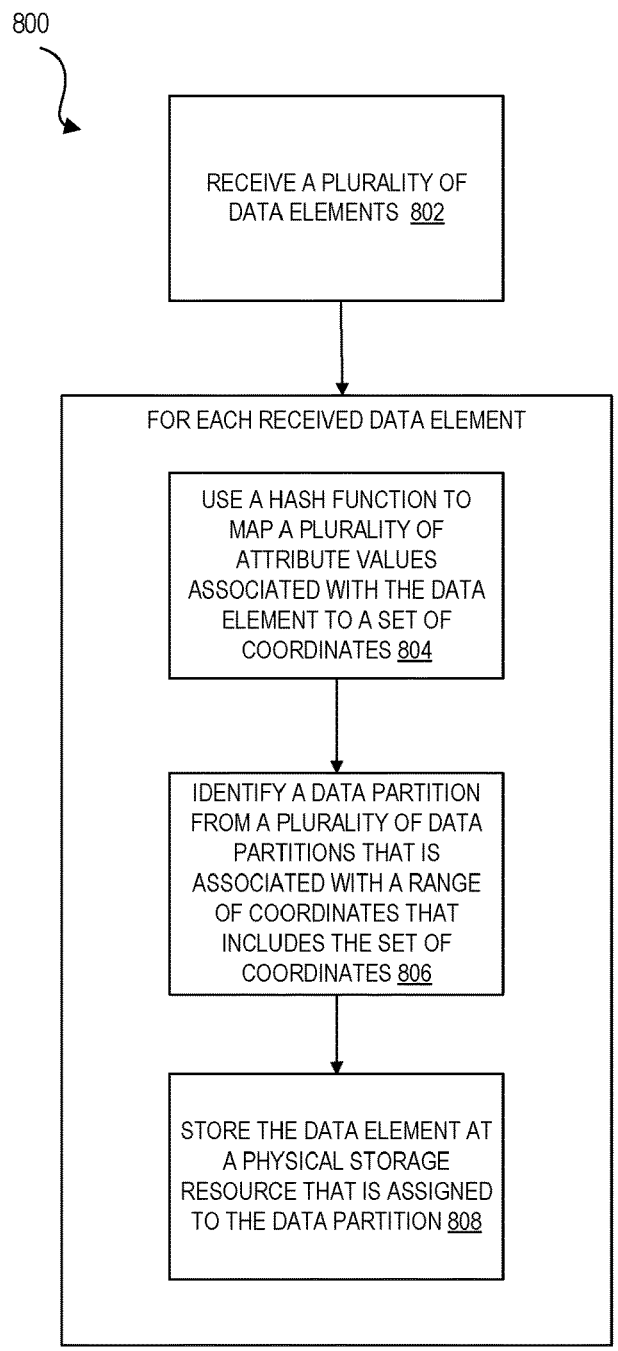
FIG. 8 is a flow diagram illustrating operations of a method for clustering data at the point of ingestion for storage using scalable storage resources according to some embodiments.

FIG. 8 is a flow diagram illustrating operations 800 for clustering data at the point of ingestion for storage using scalable storage resources according to some embodiments. Some or all of the operations 800 (or other processes described herein, or variations, and/or combinations thereof) are performed under the control of one or more computer systems configured with executable instructions and are implemented as code (for example, executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 800 are performed by an ingestion router 110 of the other figures.

The operations 800 include, at block 802, receiving a plurality of data elements, each data element including a plurality of attribute values associated with a hierarchy of attributes. As described in reference to FIG. 1, an ingestion router 110 can receive the data elements from one or more data producers 102 over one or more intermediate networks 112. The hierarchy of attributes can include any number of separate attributes associated with the data and generally represents a data "drill path" that can be used to group the data at varying levels of data granularity. In an embodiment, each received data element is associated with a plurality of attribute values corresponding to the hierarchy of data attributes.

The operations 800 further include, at block 804, for each data element of the plurality of data elements, using a hash function to map a plurality of attribute values associated with the data element to a set of coordinates. In an embodiment, the set of coordinates identifies a location in a multilevel hash tree. In one embodiment, a set of data partitions is generated, wherein each data partition of the set of data partitions is associated with a range of values of a total range of values associated with the multilevel hash tree. In an embodiment, each data element of the plurality of data elements is associated with a plurality of attribute values representing a hierarchy of data attributes. In an embodiment, each data element of the plurality of data elements is a data point of a time series of a plurality of time series.

In an embodiment, throughput for each data partition of the plurality of data partitions is monitored, it is determined that throughput for a data partition of the plurality of data partition exceeds a threshold, and the data partition is split into two or more new data partitions, each of the new data partitions associated with a subrange of the range of coordinates associated with the data partition. In an embodiment, a point at which to split the data partition is selected to balance throughput associated with each of the new or more new data partitions. In an embodiment, data is stored indicating, for each data partition of the set of data partitions, an identifier of the partition, a minimum point in the multilevel hash tree, a maximum point in the multilevel hash tree, and a creation time.

The operations 800 further include, at block 806, identifying a data partition from a plurality of data partitions that is associated with a range of coordinates that includes the set of coordinates.

The operations 800 further include, at block 808, storing the data element at a physical storage resource that is assigned to the data partition. In an embodiment, determining a storage resource of a plurality of storage resources at which to store the data element is performed during ingestion of the plurality of data elements. In an embodiment, the plurality of data elements are stored using a tiered set of storage resources, and wherein each tier of the tiered set of storage resources is associated with different performance characteristics.

In an embodiment, a query is received specifying at least one attribute value. The hash function is used to determine one or more storage resources of the plurality of storage resources at which data elements relevant to the query are stored, and the query is processed using the one or more storage resources.

Figure 9:
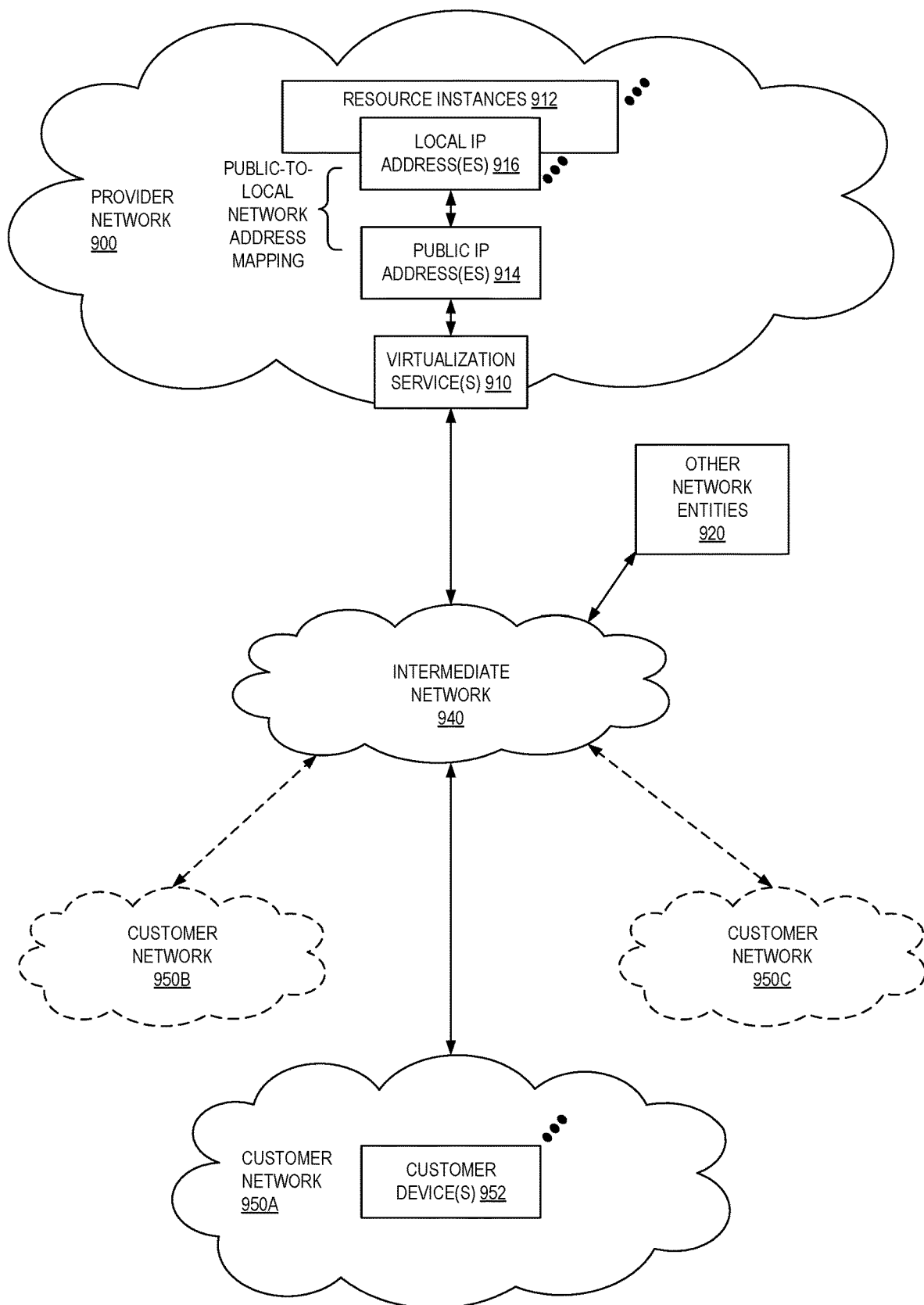
FIG. 9 illustrates an example provider network environment according to some embodiments.

FIG. 9 illustrates an example provider network (or "service provider system") environment according to some embodiments. A provider network 900 may provide resource virtualization to customers via one or more virtualization services 910 that allow customers to purchase, rent, or otherwise obtain instances 912 of virtualized resources, including but not limited to computation and storage resources, implemented on devices within the provider network or networks in one or more data centers. Local Internet Protocol (IP) addresses 916 may be associated with the resource instances 912; the local IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 6 (IPv6) addresses) that customers may obtain from the provider 900.

Conventionally, the provider network 900, via the virtualization services 910, may allow a customer of the service provider (e.g., a customer that operates one or more client networks 950A-950C including one or more customer device(s) 952) to dynamically associate at least some public IP addresses 914 assigned or allocated to the customer with particular resource instances 912 assigned to the customer. The provider network 900 may also allow the customer to remap a public IP address 914, previously mapped to one virtualized computing resource instance 912 allocated to the customer, to another virtualized computing resource instance 912 that is also allocated to the customer. Using the virtualized computing resource instances 912 and public IP addresses 914 provided by the service provider, a customer of the service provider such as the operator of customer network(s) 950A-950C may, for example, implement customer-specific applications and present the customer's applications on an intermediate network 940, such as the Internet. Other network entities 920 on the intermediate network 940 may then generate traffic to a destination public IP address 914 published by the customer network(s) 950A-950C; the traffic is routed to the service provider data center, and at the data center is routed, via a network substrate, to the local IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1919 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 900; a customer may then assign their allocated public IP addresses to particular resource instances allocated to the customer. These public IP addresses may be referred to as customer public IP addresses, or simply customer IP addresses. Instead of being assigned by the provider network 900 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 10:
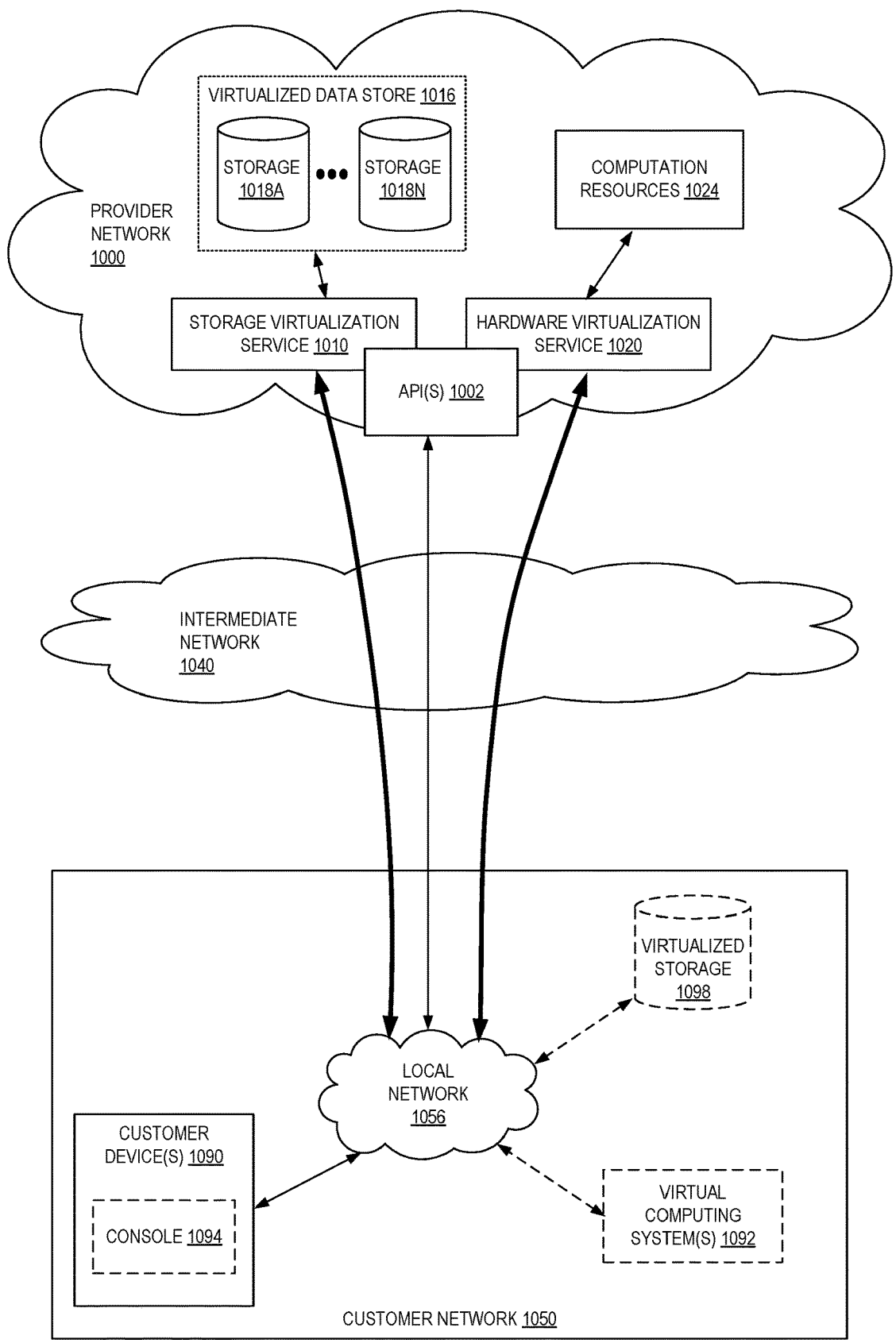
FIG. 10 is a block diagram of an example provider network that provides a storage virtualization service and a hardware virtualization service to customers according to some embodiments.

FIG. 10 is a block diagram of an example provider network that provides a storage virtualization service and a hardware virtualization service to customers, according to some embodiments. Hardware virtualization service 1020 provides multiple computation resources 1024 (e.g., VMs) to customers. The computation resources 1024 may, for example, be rented or leased to customers of the provider network 1000 (e.g., to a customer that implements customer network 1050). Each computation resource 1024 may be provided with one or more local IP addresses. Provider network 1000 may be configured to route packets from the local IP addresses of the computation resources 1024 to public Internet destinations, and from public Internet sources to the local IP addresses of computation resources 1024.

Provider network 1000 may provide a customer network 1050, for example coupled to intermediate network 1040 via local network 1056, the ability to implement virtual computing systems 1092 via hardware virtualization service 1020 coupled to intermediate network 1040 and to provider network 1000. In some embodiments, hardware virtualization service 1020 may provide one or more APIs 1002, for example a web services interface, via which a customer network 1050 may access functionality provided by the hardware virtualization service 1020, for example via a console 1094 (e.g., a web-based application, standalone application, mobile application, etc.). In some embodiments, at the provider network 1000, each virtual computing system 1092 at customer network 1050 may correspond to a computation resource 1024 that is leased, rented, or otherwise provided to customer network 1050.

From an instance of a virtual computing system 1092 and/or another customer device 1090 (e.g., via console 1094), the customer may access the functionality of storage virtualization service 1010, for example via one or more APIs 1002, to access data from and store data to storage resources 1018A-1018N of a virtual data store 1016 provided by the provider network 1000. In some embodiments, a virtualized data store gateway (not shown) may be provided at the customer network 1050 that may locally cache at least some data, for example frequently accessed or critical data, and that may communicate with virtualized data store service 1010 via one or more communications channels to upload new or modified data from a local cache so that the primary store of data (virtualized data store 1016) is maintained. In some embodiments, a user, via a virtual computing system 1092 and/or on another customer device 1090, may mount and access virtual data store 1016 volumes, which appear to the user as local virtualized storage 1098.

While not shown in FIG. 10, the virtualization service(s) may also be accessed from resource instances within the provider network 1000 via API(s) 1002. For example, a customer, appliance service provider, or other entity may access a virtualization service from within a respective virtual network on the provider network 1000 via an API 1002 to request allocation of one or more resource instances within the virtual network or within another virtual network.

Illustrative System

Figure 11:
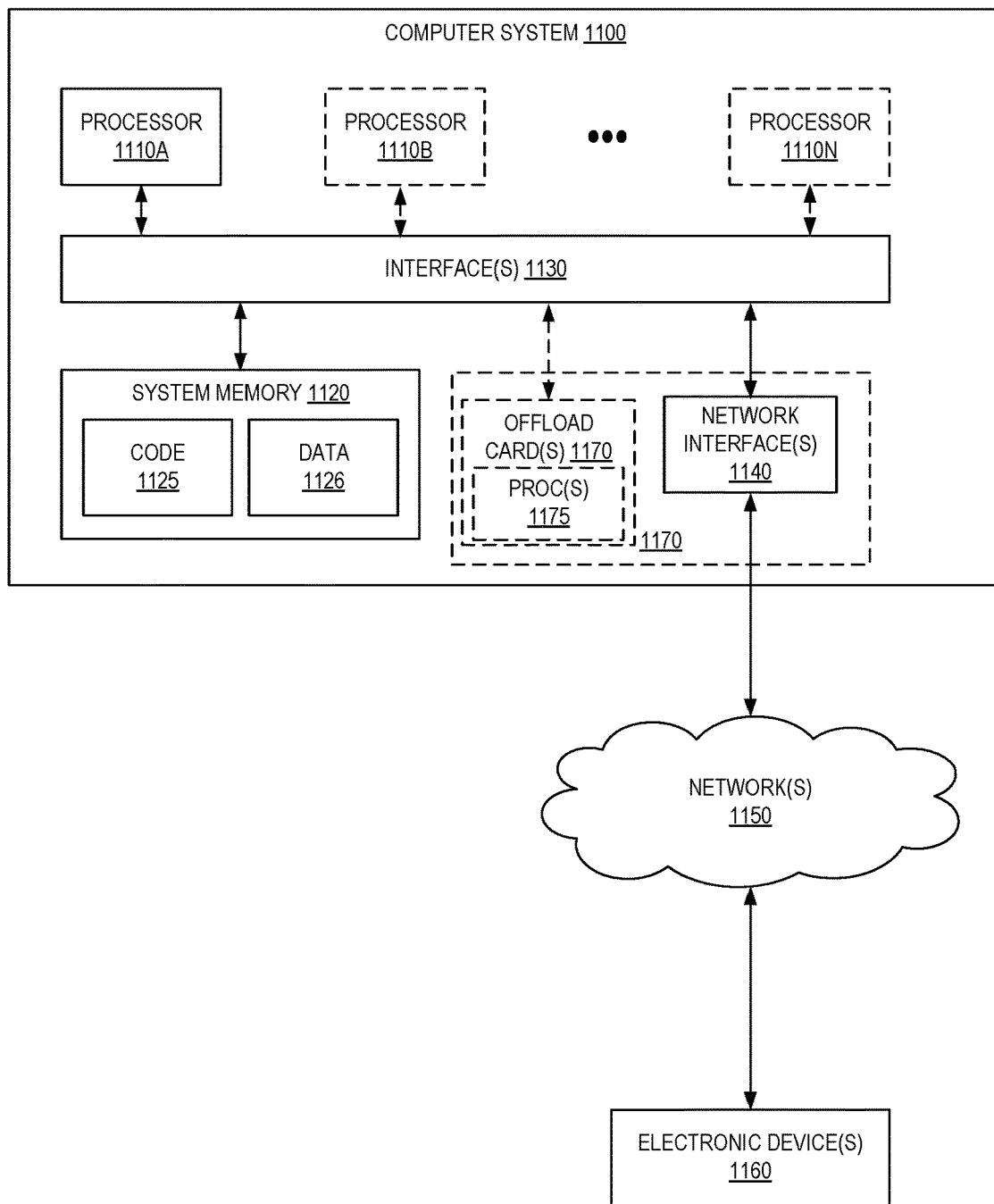
FIG. 11 is a block diagram illustrating an example computer system that may be used in some embodiments.

In some embodiments, a system that implements a portion or all of the techniques for for clustering data at the point of ingestion for storage using scalable storage resources as described herein may include a general-purpose computer system that includes or is configured to access one or more computer-accessible media, such as computer system 1100 illustrated in FIG. 11. In the illustrated embodiment, computer system 1100 includes one or more processors 1110 coupled to a system memory 1120 via an input/output (I/O) interface 1130. Computer system 1100 further includes a network interface 1140 coupled to I/O interface 1130. While FIG. 11 shows computer system 1100 as a single computing device, in various embodiments a computer system 1100 may include one computing device or any number of computing devices configured to work together as a single computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1110 may commonly, but not necessarily, implement the same ISA.

System memory 1120 may store instructions and data accessible by processor(s) 1110. In various embodiments, system memory 1120 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for clustering data at the point of ingestion for storage using scalable storage resources, are shown stored within system memory 1120 as code 1125 and data 1126.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1150, such as other computer systems or devices as illustrated in FIG. 1, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1100 includes one or more offload cards 1170 (including one or more processors 1175, and possibly including the one or more network interfaces 1140) that are connected using an I/O interface 1130 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 1100 may act as a host electronic device (e.g., operating as part of a hardware virtualization service) that hosts compute instances, and the one or more offload cards 1170 execute a virtualization manager that can manage compute instances that execute on the host electronic device. As an example, in some embodiments the offload card(s) 1170 can perform compute instance management operations such as pausing and/or un-pausing compute instances, launching and/or terminating compute instances, performing memory transfer/copying operations, etc. These management operations may, in some embodiments, be performed by the offload card(s) 1170 in coordination with a hypervisor (e.g., upon a request from a hypervisor) that is executed by the other processors 1110A-1110N of the computer system 1100. However, in some embodiments the virtualization manager implemented by the offload card(s) 1170 can accommodate requests from other entities (e.g., from compute instances themselves), and may not coordinate with (or service) any separate hypervisor.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 204A-204D) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   generating a set of data partitions, wherein each data partition of the set of data partitions is associated with a range of values of a total range of values associated with a multilevel hash tree;
   storing data indicating, for each data partition of the set of data partitions, an identifier of the data partition, a minimum point in the multilevel hash tree, and a maximum point in the multilevel hash tree;
   receiving a plurality of data elements, wherein each data element of the plurality of data elements includes a plurality of attribute values associated with a hierarchy of attributes;
   for each data element of the plurality of data elements:
      generating a set of coordinates for the data element, wherein each coordinate of the set of coordinates is generated using a hash function on a respective attribute value of a plurality of attribute values associated with the data element, and wherein each coordinate of the set of coordinates is associated with an attribute of the hierarchy of attributes and identifies a point on a respective level of the multilevel hash tree corresponding to the attribute;
      determining a storage resource of a plurality of storage resources at which to store the data element based on a mapping of the set of coordinates to a data partition of the set of data partitions, wherein the storage resource is assigned to the data partition; and
      storing the data element at the storage resource.

2. The computer-implemented method of claim 1, further comprising identifying, from the set of data partitions associated with the multilevel hash tree, the data partition that is associated with a range of coordinates that includes the set of coordinates.

3. The computer-implemented method of claim 1, wherein the set of coordinates identifies a point on a continuous range of values defined by the multilevel hash tree.

4. The computer-implemented method of claim 1, further comprising:
   monitoring throughput for each data partition of the set of data partitions;
   determining that throughput for a data partition of the set of data partitions exceeds a threshold; and
   splitting the data partition into two or more new data partitions, each of the new data partitions associated with a subrange of a range of coordinates associated with the data partition.

5. The computer-implemented method of claim 1, further comprising:
   splitting a data partition of the set of data partitions into two or more new data partitions, wherein a point at which to split the data partition is selected to balance throughput associated with each of the two or more new data partitions.

6. The computer-implemented method of claim 1, further comprising:
   receiving a query specifying at least one attribute value;
   using the hash function to determine one or more storage resources of the plurality of storage resources at which data elements relevant to the query are stored; and
   processing the query using the one or more storage resources.

7. The computer-implemented method of claim 1, wherein determining a storage resource of a plurality of storage resources at which to store the data element is performed during ingestion of the plurality of data elements.

8. The computer-implemented method of claim 1, wherein each data element of the plurality of data elements is a data point of a time series of a plurality of time series.

9. The computer-implemented method of claim 1, wherein the plurality of data elements are stored using a tiered set of storage resources, and wherein each tier of the tiered set of storage resources is associated with different performance characteristics.

10. A system comprising:
   an ingestion router implemented by a first one or more electronic devices, including a processor and memory, of a service provider network, the ingestion router including instructions that upon execution cause the ingestion router to:
      generate a set of data partitions, wherein each data partition of the set of data partitions is associated with a range of values of a total range of values associated with a multilevel hash tree;
      store data indicating, for each data partition of the set of data partitions, an identifier of the data partition, a minimum point in the multilevel hash tree, a maximum point in the multilevel hash tree,
      receive a plurality of data elements, wherein each data element of the plurality of data elements includes a plurality of attribute values associated with a hierarchy of attribute, and
      for each data element of the plurality of data elements:
         generate a set of coordinates for the data element, wherein each coordinate of the set of coordinates is generated using a hash function on a respective attribute value of a plurality of attribute values associated with the data element, and wherein each coordinate of the set of coordinates is associated with an attribute of the hierarchy of attributes and identifies a point on a respective level of the multilevel hash tree corresponding to the attribute,
         determine a storage resource of a plurality of storage resources at which to store the data element based on a mapping of the set of coordinates to a data partition of the set of data partitions, wherein the storage resource is assigned to the data partition, and send the data element to a storage service for storage using the storage resource; and the storage service implemented by a second one or more electronic devices of the service provider network, the storage service including instructions that upon execution cause the storage to:

receive the plurality of data elements from the ingestion router, and store each data element of the plurality of data elements at a storage resource to which the data element is assigned.

11. The system of claim 10, wherein the ingestion router further includes instructions that upon execution cause the ingestion router to identify, from the set of data partitions associated with the multilevel hash tree, a data partition that is associated with a range of coordinates that includes the set of coordinates.

12. The system of claim 10, wherein the set of coordinates identifies a point on a continuous range of values defined by the multilevel hash tree.

13. The system of claim 10, wherein the instructions upon execution further cause the ingestion router to:

monitor throughput for each data partition of the set of data partitions;

determine that throughput for a data partition of the set of data partitions exceeds a threshold; and split the data partition into two or more new data partitions, each of the new data partitions associated with a subrange of the range of coordinates associated with the data partition.

14. The system of claim 10, wherein the instructions upon execution further cause the ingestion router to:

split a data partition of the set of data partitions into two or more new data partitions, wherein a point at which to split the data partition is selected to balance throughput associated with each of the two or more new data partitions.

15. The system of claim 10, wherein determining a storage resource of a plurality of storage resources at which to store the data element is performed during ingestion of the plurality of data elements.

* * * * *